(12) United States Patent
Lee et al.

(10) Patent No.: US 9,644,714 B2
(45) Date of Patent: May 9, 2017

(54) PLANETARY GEAR TRAIN OF AUTOMATIC TRANSMISSION FOR VEHICLE

(71) Applicant: Hyundai Motor Company, Seoul (KR)

(72) Inventors: KyeongHun Lee, Seoul (KR); Chang Wook Lee, Suwon-si (KR); JongSool Park, Hwaseong-si (KR); Sueng Ho Lee, Seoul (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/925,842

(22) Filed: Oct. 28, 2015

(65) Prior Publication Data

US 2016/0363193 A1 Dec. 15, 2016

(30) Foreign Application Priority Data

Jun. 15, 2015 (KR) .................. 10-2015-0084257

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 4,683,776 A | * | 8/1987 | Klemen | ................ F16H 3/66 |
| | | | | 475/286 |
| 8,187,130 B1 | * | 5/2012 | Mellet | .................. F16H 3/725 |
| | | | | 475/276 |
| 8,197,376 B2 | | 6/2012 | Gumpoltsberger et al. | |
| 8,961,355 B2 | | 2/2015 | Hart et al. | |
| 9,103,414 B1 | * | 8/2015 | Goleski | ................ F16H 3/66 |

FOREIGN PATENT DOCUMENTS

| KR | 10-2012-0132021 A | 12/2012 |
| KR | 10-2013-0013251 A | 2/2013 |

* cited by examiner

*Primary Examiner* — Colby M Hansen
(74) *Attorney, Agent, or Firm* — Morgan Lewis & Bockius LLP (57) ABSTRACT

A planetary gear train of an automatic transmission for a vehicle may include an input shaft receiving power from an engine, an output shaft outputting power changed in speed, a first planetary gear set which has first, second, and third rotating elements, a second planetary gear set which has fourth, fifth, and sixth rotating elements, a third planetary gear set which has seventh, eighth, and ninth rotating elements, a fourth planetary gear set which has tenth, eleventh, and twelfth rotating elements, and six control elements disposed between the rotating elements, and disposed at positions where the rotating elements are selectively connected to a transmission housing.

14 Claims, 2 Drawing Sheets

| SPEED | Control element for gear shift operation ||||||  Gear ratio | Ratio between gear shift stages | Span of gear ratio |
|---|---|---|---|---|---|---|---|---|---|
| | B1 | B2 | B3 | C1 | C2 | C3 | | | |
| D1 | | ● | ● | | | ● | 5.225 | 1.598 | 9.040 |
| D2 | | | ● | | ● | ● | 3.270 | 1.486 | |
| D3 | | ● | ● | | ● | | 2.201 | 1.332 | |
| D4 | | | ● | ● | ● | | 1.652 | 1.329 | |
| D5 | | ● | | ● | | | 1.243 | 1.243 | |
| D6 | | | | ● | ● | ● | 1.000 | 1.151 | |
| D7 | | ● | | ● | ● | | 0.869 | 1.219 | |
| D8 | ● | ● | | ● | | ● | 0.713 | 1.234 | |
| D9 | ● | ● | | ● | | ● | 0.578 | | |
| REV | ● | | ● | | | ● | -4.026 | | |

//!PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0084257 filed in Jun. 15, 2015, the entire contents of which is incorporated herein for all purposes by this reference.

BACKGROUND OF THE INVENTION

Field of the Invention

The present invention relates to an automatic transmission for a vehicle, and more particularly, to a planetary gear train of an automatic transmission for a vehicle, which is capable of implementing at least nine forward speeds using a minimum number of configurations, improving power transmission performance and fuel efficiency by increasing a span of a gear shift ratio, and ensuring linearity of ratios between gear shift stages.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the case of the automatic transmission, the number of internal components is increased as the number of gear shift stages is increased, and as a result, the automatic transmission may be difficult to mount, the manufacturing cost and weight may be increased, and power transmission efficiency may be deteriorated.

Therefore, in order to increase an effect of improving fuel efficiency by implementing an automatic transmission with multiple stages, it is important to develop a planetary gear train capable of maximizing efficiency using a small number of components.

In this respect, recently, an eight-speed automatic transmission has been implemented, and research and developments are being actively conducted on a planetary gear train that may implement gear shift stages for eight or more speeds.

However, in the case of the recent eight-speed automatic transmission, a span of a gear shift ratio is maintained at a level of 6.5 to 7.5, and as a result, there is a problem in that the recent eight-speed automatic transmission has no great effect of improving fuel efficiency.

Therefore, because it is impossible to ensure linearity of ratios between gear shift stages in a case in which a span of a gear shift ratio in the case of the eight-speed automatic transmission is increased to 9.0 or more, driving efficiency of the engine and drivability of the vehicle deteriorate. Accordingly, there is a need for development of a highly efficient automatic transmission with the gear shift stages for nine or more speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle, which is capable of implementing gear shift stages for at least nine forward speeds and one reverse speed using a minimum number of configurations, improving power transmission performance and fuel efficiency by increasing a span of a gear shift ratio, and ensuring linearity of ratios between the gear shift stages.

According to various aspects of the present invention, a planetary gear train of an automatic transmission for a vehicle may include an input shaft receiving power from an engine, an output shaft outputting power changed in speed, a first planetary gear set which has first, second, and third rotating elements, a second planetary gear set which has fourth, fifth, and sixth rotating elements, a third planetary gear set which has seventh, eighth, and ninth rotating elements, a fourth planetary gear set which has tenth, eleventh, and twelfth rotating elements, and six control elements disposed between the rotating elements, and disposed at positions where the rotating elements are selectively connected to a transmission housing, in which the input shaft may be continuously connected with the eighth rotating element and simultaneously selectively connected with the fifth rotating element, the output shaft may be continuously connected with the eleventh rotating element and simultaneously selectively connected with the ninth rotating element, the second rotating element may be continuously connected with the sixth rotating element, the third rotating element may be continuously connected to the seventh rotating element and the tenth rotating element, the fourth rotating element may be continuously connected with the ninth rotating element, the first rotating element may be selectively connected with the transmission housing, and gear shift stages for at least nine forward speeds and at least one may be implemented by operations of three control elements among the six control elements.

The fifth rotating element may be selectively connected with the transmission housing and simultaneously selectively connected with the seventh rotating element, and the twelfth rotating element may be selectively connected with the transmission housing.

The first, second, and third rotating elements of the first planetary gear set may be a sun gear, a planet carrier, and a ring gear, respectively, the fourth, fifth, and sixth rotating elements of the second planetary gear set may be a sun gear, a planet carrier, and a ring gear, respectively, the seventh, eighth, and ninth rotating elements of the third planetary gear set may be a sun gear, a ring gear, and a planet carrier, respectively, and the tenth, eleventh, and twelfth rotating elements of the fourth planetary gear set may be a sun gear, a planet carrier, and a ring gear, respectively.

The six control elements may include three brakes, and three clutches.

According to various aspects of the present invention, a planetary gear train of an automatic transmission for a vehicle may include an input shaft receiving power from an engine, an output shaft outputting power changed in speed, a first planetary gear set having first, second, and third rotating elements, a second planetary gear set having fourth, fifth, and sixth rotating elements, a third planetary gear set having seventh, eighth, and ninth rotating elements, a fourth planetary gear set having tenth, eleventh, and twelfth rotating elements, a first rotating shaft including the first rotating element, and selectively connected to a transmission housing, a second rotating shaft including the second rotating element and the sixth rotating element, a third rotating shaft including the third rotating element, the seventh rotating element, and the tenth rotating element, a fourth rotating shaft including the fourth rotating element, and the ninth rotating element, a fifth rotating shaft including the fifth rotating element, and selectively connected to the input shaft and the third rotating shaft, or selectively connected with the transmission housing, a sixth rotating shaft including the ninth rotating element, and directly connected to the input shaft, a seventh rotating shaft including the eleventh rotating element, and directly connected to the output shaft and simultaneously selectively connected to the fourth rotating shaft, an eighth rotating shaft including the twelfth rotating element, and selectively connected to the transmission housing, and six control elements disposed between the rotating elements, and disposed at positions where the rotating elements are selectively connected to the transmission housing.

The first planetary gear set may be a single pinion planetary gear set in which the first rotating element is a first sun gear, the second rotating element is a first planet carrier, and the third rotating element is a first ring gear, the second planetary gear set may be a single pinion planetary gear set in which the fourth rotating element is a second sun gear, the fifth rotating element is a second planet carrier, and the sixth rotating element is a second ring gear, the third planetary gear set may be a double pinion planetary gear set in which the seventh rotating element is a third sun gear, the eighth rotating element is a third ring gear, and the ninth rotating element is a third planet carrier, and the fourth planetary gear set may be a single pinion planetary gear set in which the tenth rotating element is a fourth sun gear, the eleventh rotating element is a fourth planet carrier, and the twelfth rotating element is a fourth ring gear.

The six control elements may include a first clutch selectively connecting the fourth rotating shaft and the seventh rotating shaft, a second clutch selectively connecting the input shaft and the fifth rotating shaft, a third clutch selectively connecting the third rotating shaft and the fifth rotating shaft, a first brake selectively connecting the fifth rotating shaft and the transmission housing, a second brake selectively connecting the first rotating shaft and the transmission housing, and a third brake selectively connecting the eighth rotating shaft and the transmission housing.

Gear shift stages, which are implemented by selectively operating the six control elements, may include a first forward gear shift stage implemented by simultaneously operating the third clutch and the second and third brakes, a second forward gear shift stage implemented by simultaneously operating the second and third clutches and the third brake, a third forward gear shift stage implemented by simultaneously operating the second clutch and the second and third brakes, a fourth forward gear shift stage implemented by simultaneously operating the first and second clutches and the third brake, a fifth forward gear shift stage implemented by simultaneously operating the first and second clutches and the second brake, a sixth forward gear shift stage implemented by simultaneously operating the first, second, and third clutches, a seventh forward gear shift stage implemented by simultaneously operating the first and third clutches and the second brake, an eighth forward gear shift stage implemented by simultaneously operating the first and third clutches and the first brake, a ninth forward gear shift stage implemented by simultaneously operating the first clutch and the first and second brakes, and a reverse gear shift stage implemented by simultaneously operating the first, second, and third brakes.

Gear shift stages, which are implemented by selectively operating the six control elements may include a first forward gear shift stage implemented by simultaneously operating the third clutch and the second and third brakes, a second forward gear shift stage implemented by simultaneously operating the second and third clutches and the third brake, a third forward gear shift stage implemented by simultaneously operating the second clutch and the second and third brakes, a fourth forward gear shift stage implemented by simultaneously operating the first clutch and the second and third brakes, a fifth forward gear shift stage implemented by simultaneously operating the first and second clutches and the second brake, a sixth forward gear shift stage implemented by simultaneously operating the first, second, and third clutches, a seventh forward gear shift stage implemented by simultaneously operating the first and third clutches and the second brake, an eighth forward gear shift stage implemented by simultaneously operating the first and third clutches and the first brake, a ninth forward gear shift stage implemented by simultaneously operating the first clutch and the first and second brakes, and a reverse gear shift stage implemented by simultaneously operating the first, second, and third brakes.

According to various aspects of the present invention, a planetary gear train of an automatic transmission for a vehicle may include an input shaft which receives power from an engine, an output shaft which outputs power changed in speed, a first planetary gear set having first, second, and third rotating elements, a second planetary gear set having fourth, fifth, and sixth rotating elements, a third planetary gear set having seventh, eighth, and ninth rotating elements, a fourth planetary gear set having tenth, eleventh, and twelfth rotating elements, a first rotating shaft including the first rotating element, and selectively connected to a transmission housing, a second rotating shaft including the second rotating element, and the sixth rotating element, a third rotating shaft including the third rotating element, the seventh rotating element, and the tenth rotating element, a fourth rotating shaft including the fourth rotating element, and the ninth rotating element, a fifth rotating shaft including the fifth rotating element, and selectively connected to the input shaft and the third rotating shaft, or selectively connected with the transmission housing, a sixth rotating shaft including the eighth rotating element, and directly connected to the input shaft, a seventh rotating shaft including the eleventh rotating element, and directly connected to the output shaft and simultaneously and selectively connected to the fourth rotating shaft, an eighth rotating shaft including the twelfth rotating element, and selectively connected to the transmission housing, a first clutch selectively connecting the fourth rotating shaft and the seventh rotating shaft, a second clutch selectively connecting the input shaft and the fifth rotating shaft, a third clutch selectively connecting the third rotating shaft and the fifth rotating shaft, a first brake selectively connecting the fifth rotating shaft and the transmission housing, a second brake selectively connecting the first rotating shaft and the transmission housing, and a third brake selectively connecting the eighth rotating shaft and the transmission housing.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
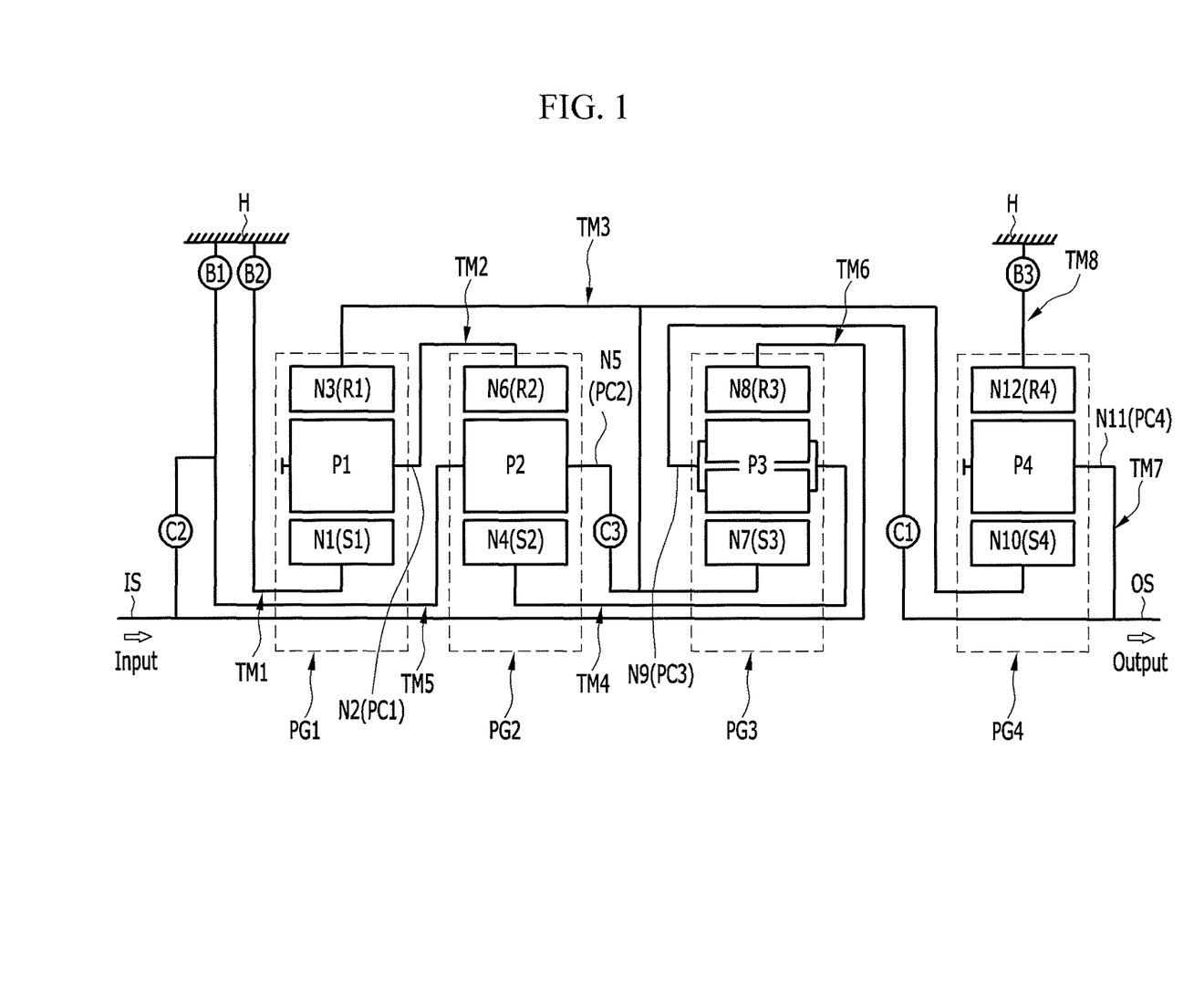
FIG. 1 is a configuration diagram of an exemplary planetary gear train according to the present invention.

FIG. 1 is a configuration diagram of a planetary gear train according to various embodiments of the present invention.

Referring to FIG. 1, the planetary gear train according to various embodiments of the present invention includes first, second, third, and fourth planetary gear sets PG1, PG2, PG3, and PG4 which are coaxially disposed, an input shaft IS, an output shaft OS, eight rotating shafts TM1 to TM8 which directly connect respective rotating elements of the first, second, third, and fourth planetary gear sets PG1, PG2, PG3, and PG4, six control elements C1 to C3 and B1 to B3, and a transmission housing H.

Further, rotational power inputted from the input shaft IS is changed in speed by complementary operations of the first, second, third, and fourth planetary gear sets PG1, PG2, PG3, and PG4, and then outputted through the output shaft OS.

The respective simple planetary gear sets are disposed in the order of the first, second, third, and fourth planetary gear sets PG1, PG2, PG3, and PG4 from an engine.

The input shaft IS is an input member, and rotational power from a crankshaft of the engine is converted into torque by a torque converter, and the torque is inputted.

The output shaft OS is an output member, and disposed coaxially with the input shaft IS to transmit the driving power, which is changed in speed, to a driving shaft through a differential apparatus.

The first planetary gear set PG1 is a single pinion planetary gear set, and includes rotating elements including a first sun gear S1 which is a first rotating element N1, a first planet carrier PC1 which is a second rotating element N2 for supporting a first pinion P1 that externally engages with the first sun gear S1 that is the first rotating element N1, and a first ring gear R1 which is a third rotating element N3 that internally engages with the first pinion P1.

The second planetary gear set PG2 is a single pinion planetary gear set, and includes a second sun gear S2 which is a fourth rotating element N4, a second planet carrier PC2 which is a fifth rotating element N5 for supporting a second pinion P2 that externally engages with the second sun gear S2 that is the fourth rotating element N4, and a second ring gear R2 which is a sixth rotating element N6 that internally engages with the second pinion P2.

The third planetary gear set PG3 is a double pinion planetary gear set, and includes a third sun gear S3 which is a seventh rotating element N7, a third ring gear R3 which is an eighth rotating element N8 that internally engages with third pinions P3 that externally engage with the third sun gear S3, and a third planet carrier PC3 which is a ninth rotating element N9 that supports the third pinions P3.

The fourth planetary gear set PG4 is a single pinion planetary gear set and includes a fourth sun gear S4 which is a tenth rotating element N10, a fourth planet carrier PC4 which is an eleventh rotating element N11 for supporting a fourth pinion P4 that externally engages with the fourth sun gear S4 that is the tenth rotating element N10, and a fourth ring gear R4 which is a twelfth rotating element N12 that internally engages with the fourth pinion P4.

The first, second, third, and fourth planetary gear sets PG1, PG2, PG3, and PG4 are operated while retaining the total of eight rotating shafts TM1 to TM8 in a state in which the second rotating element N2 is directly connected with the sixth rotating element N6, the third rotating element N3 is directly connected to the seventh rotating element N7 and the tenth rotating element N10, and the fourth rotating element N4 is directly connected with the ninth rotating element N9.

The configurations of the eight rotating shafts TM1 to TM8 will be described below.

The first rotating shaft TM1 includes the first rotating element N1 (the first sun gear), and is selectively connected to the transmission housing H.

The second rotating shaft TM2 includes the second rotating element N2 (the first planet carrier) and the sixth rotating element N6 (the second ring gear).

The third rotating shaft TM3 includes the third rotating element N3 (the third ring gear), the seventh rotating element N7 (the third sun gear), and the tenth rotating element N10 (the fourth sun gear).

The fourth rotating shaft TM4 includes the fourth rotating element N4 (the second sun gear), and the ninth rotating element N9 (the third planet carrier).

The fifth rotating shaft TM5 includes the fifth rotating element N2 (the second planet carrier), and is selectively connected to the input shaft IS and the third rotating shaft TM3 and simultaneously and selectively connected with the transmission housing H.

The sixth rotating shaft TM6 includes the eighth rotating element N8 (the third ring gear), and is directly connected with the input shaft IS so as to be continuously operated as an input element.

The seventh rotating shaft TM7 includes the eleventh rotating element N4 (the fourth planet carrier), and is selectively connected with the fourth rotating shaft TM4 and simultaneously and directly connected with the output shaft OS so as to be continuously operated as an output element.

The eighth rotating shaft TM1 includes the twelfth rotating element N12 (the fourth ring gear), and is selectively connected with the transmission housing H.

Further, the three clutches C1, C2, and C3, which are control elements, are disposed at portions where the rotating shafts among the rotating shafts TM1 to TM8 are selectively connected to each other.

In addition, the three brakes B1, B2, and B3, which are control elements, are disposed at portions where the rotating shafts among the rotating shafts TM1 to TM8 are selectively connected with the transmission housing H.

Positions at which the six control elements C1 to C3 and B1 to B3 are disposed will be described below.

The first clutch C1 is disposed between the fourth rotating shaft TM4 and the seventh rotating shaft TM7, and allows the fourth rotating shaft TM4 and the seventh rotating shaft TM7 to be selectively integrated with each other.

The second clutch C2 is disposed between the input shaft IS and the fifth rotating shaft TM5, and allows the input shaft IS and the fifth rotating shaft TM5 to be selectively integrated with each other.

The third clutch C3 is interposed between the third rotating shaft TM3 and the fifth rotating shaft TM5, and allows the third rotating shaft TM3 and the fifth rotating shaft TM5 to be selectively integrated with each other.

The first brake B1 is interposed between the fifth rotating shaft TM5 and the transmission housing H, and allows the fifth rotating shaft TM5 to be operated as a selectively fixed element.

The second brake B2 is interposed between the first rotating shaft TM1 and the transmission housing H, and allows the first rotating shaft TM1 to be operated as a selectively fixed element.

The third brake B3 is interposed between the eighth rotating shaft TM8 and the transmission housing H, and allows the eighth rotating shaft TM8 to be operated as a selectively fixed element.

The control elements, which include the first, second, and third clutches C1, C2, and C3 and the first, second, and third brakes B1, B2, and B3 as described above, may be a multi-plate hydraulic frictional coupling unit that is frictionally coupled by hydraulic pressure.

Figure 2:
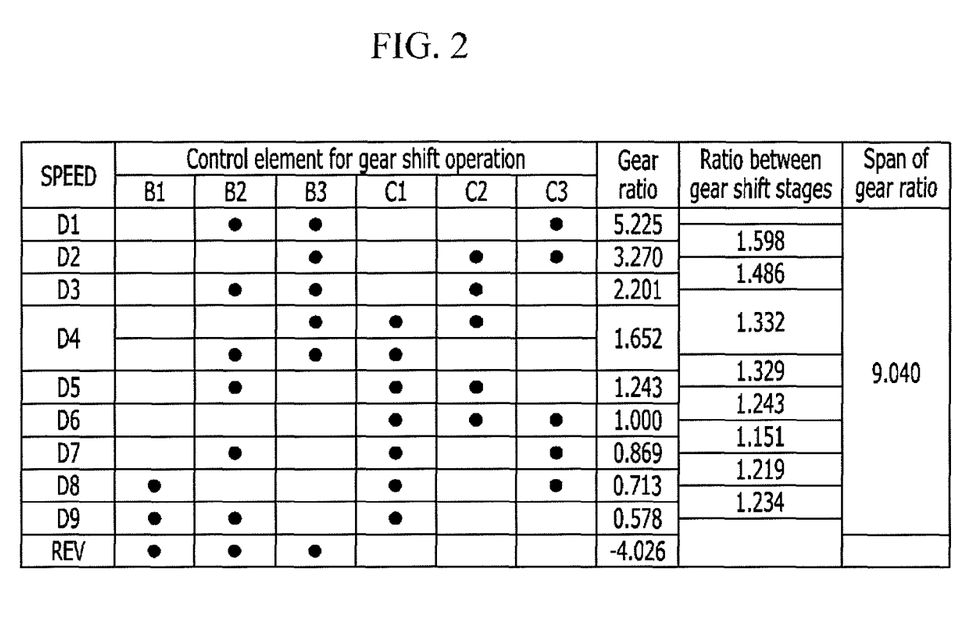
FIG. 2 is a table representing operations at respective gear shift stages implemented by respective control elements applied to the exemplary planetary gear train according to the present invention.

FIG. 2 is a table representing operations at respective gear shift stages implemented by respective control elements applied to the planetary gear train according to various embodiments of the present invention.

As illustrated in FIG. 2, according to the planetary gear train according to various embodiments of the present invention, gear shift operations are carried out by operating the three control elements at respective gear shift stages.

At a gear shift stage for a first forward speed D1, the third clutch C3 and the second and third brakes B2 and B3 are operated simultaneously. Therefore, in a state in which the third rotating shaft TM3 and the fifth rotating shaft TM5 are connected to each other by the operation of the third clutch C3, power is inputted to the sixth rotating shaft TM6, a gear shift operation for the first forward speed is carried out while the first rotating shaft TM1 and the eighth rotating shaft TM8 are operated as fixed elements by the operations of the second and third brakes B2 and B3, and the power is outputted through the seventh rotating shaft TM7.

At a gear shift stage for a second forward speed D2, the second and third clutches C2 and C3 and the third brake B3 are operated simultaneously. Therefore, in a state in which the input shaft IS and the fifth rotating shaft TM5 are connected to each other by the operation of the second clutch C2, and the third rotating shaft TM3 and the fifth rotating shaft TM5 are connected to each other by the operation of the third clutch C3, power is inputted through the sixth rotating shaft TM6, a gear shift operation for the second forward speed is carried out while the eighth rotating shaft TM8 is operated as a fixed element by the operation of the third brake B3, and the power is outputted through the seventh rotating shaft TM7.

At a gear shift stage for a third forward speed D3, the second clutch C2 and the second and third brakes B2 and B3 are operated simultaneously. Therefore, in a state in which the input shaft IS and the fifth rotating shaft TM5 are connected to each other by the operation of the second clutch C2, power is inputted through the sixth rotating shaft TM6, a gear shift operation for the third forward speed is carried out while the first rotating shaft TM1 and the eighth rotating shaft TM8 are operated as fixed elements by the operations of the second and third brakes B2 and B3, and the power is outputted through the seventh rotating shaft TM7.

At a gear shift stage for a fourth forward speed D4, the first and second clutches C1 and C2 and the third brake B3 are operated simultaneously. Therefore, in a state in which the fourth rotating shaft TM4 and the seventh rotating shaft TM7 are connected to each other by the operation of the first clutch C1, and the input shaft IS and the fifth rotating shaft TM5 are connected to each other by the operation of the second clutch C2, power is inputted through the sixth rotating shaft TM6, a gear shift operation for the fourth forward speed is carried out while the eighth rotating shaft TM8 is operated as a fixed element by the operation of the third brake B3, and the power is outputted through the seventh rotating shaft TM7.

The gear shift stage for the fourth forward speed may also be implemented by controlling other control elements.

That is, the first clutch C1 and the second and third brakes B2 and B3 are operated simultaneously. Therefore, in a state in which the fourth rotating shaft TM4 and the seventh rotating shaft TM7 are connected to each other by the operation of the first clutch C1, power is inputted through the sixth rotating shaft TM6, a gear shift operation for the fourth forward speed is carried out while the first rotating shaft TM1 and the eighth rotating shaft TM8 are operated as fixed elements by the operations of the second and third brakes B2 and B3, and the power is outputted through the seventh rotating shaft TM7.

At a gear shift stage for a fifth forward speed D5, the first and second clutches C1 and C2 and the second brake B2 are operated simultaneously. Therefore, in a state in which the fourth rotating shaft TM4 and the seventh rotating shaft TM7 are connected to each other by the operation of the first clutch C1, and the input shaft IS and the fifth rotating shaft TM5 are connected to each other by the operation of the second clutch C2, power is inputted through the sixth rotating shaft TM6, a gear shift operation for the fifth forward speed is carried out while the first rotating shaft TM1 is operated as a fixed element by the operation of the second brake B2, and the power is outputted through the seventh rotating shaft TM7.

At a gear shift stage for a sixth forward speed D6, the first, second, and third clutches C1, C2, and C3 are operated simultaneously. Therefore, the fourth rotating shaft TM4 and the seventh rotating shaft TM7 are connected to each other by the operation of the first clutch C1, the input shaft IS and the fifth rotating shaft TM5 are connected to each other by the operation of the second clutch C2, and the third rotating shaft TM3 and the fifth rotating shaft TM5 are connected to each other by the operation of the third clutch C3, such that all of the first, second, third, and fourth planetary gear sets PG1, PG2, PG3, and PG4 are directly connected, and as a result, a gear shift operation for the sixth forward speed, which outputs the inputted power as it is, is carried out, and the power is outputted through the seventh rotating shaft TM7.

At a gear shift stage for a seventh forward speed D7, the first and third clutches C1 and C3 and the second brake B2 are operated simultaneously. Therefore, in a state in which the fourth rotating shaft TM4 and the seventh rotating shaft TM7 are connected to each other by the operation of the first clutch C1, and the third rotating shaft TM3 and the fifth rotating shaft TM5 are connected to each other by the operation of the third clutch C3, power is inputted through the sixth rotating shaft TM6, a gear shift operation for the seventh forward speed is carried out while the first rotating shaft TM1 is operated as a fixed element by the operation of the second brake B2, and the power is outputted through the seventh rotating shaft TM7.

At a gear shift stage for an eighth forward speed D8, the first and third clutches C1 and C3 and the first brake B1 are operated simultaneously. Therefore, in a state in which the fourth rotating shaft TM4 and the seventh rotating shaft TM7 are connected to each other by the operation of the first clutch C1, and the third rotating shaft TM3 and the fifth rotating shaft TM5 are connected to each other by the operation of the third clutch C3, power is inputted through the sixth rotating shaft TM6, a gear shift operation for the eighth forward speed is carried out while the fifth rotating shaft TM5 is operated as a fixed element by the operation of the first brake B1, and the power is outputted through the seventh rotating shaft TM7.

At a gear shift stage for a ninth forward speed D9, the first clutch C1 and the first and second brakes B1 and B2 are operated simultaneously. Therefore, in a state in which the fourth rotating shaft TM4 and the seventh rotating shaft TM7 are connected to each other by the operation of the first clutch C1, power is inputted through the sixth rotating shaft TM6, a gear shift operation for the ninth forward speed is carried out while the fifth rotating shaft TM5 and the first rotating shaft TM1 are operated as fixed elements by the operations of the first and second brakes B1 and B2, and the power is outputted through the seventh rotating shaft TM7.

At a reverse gear shift stage REV, the first, second, and third brakes B1, B2, and B3 are operated simultaneously. Therefore, a reverse gear shift operation is carried out while the fifth, first, and eighth rotating shafts TM5, TM1, and TM8 are operated as fixed elements by the operations of the first, second, and third brakes B1, B2, and B3, and power for reverse rotation is outputted through the seventh rotating shaft TM7.

The planetary gear train according to various embodiments of the present invention may implement the gear shift stages for at least nine forward speeds and one reverse speed by operating and controlling the four planetary gear sets PG1, PG2, PG3, and PG4 using the three clutches C1, C2, and C3 and the three brakes B1, B2, and B3.

In addition, all ratios between the gear shift stages are 1.2 or more except for 6/7 forward gear shift stages, while ensuring linearity, thereby improving drivability such as acceleration before and after the gear shift operations, and a sense of rhythm of an engine speed.

In addition, a span of a gear shift ratio is 9.0 or more, thereby maximizing driving efficiency of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, the planetary gear train comprising:
   an input shaft receiving power from an engine;
   an output shaft outputting power changed in speed;
   a first planetary gear set which has first, second, and third rotating elements;
   a second planetary gear set which has fourth, fifth, and sixth rotating elements;
   a third planetary gear set which has seventh, eighth, and ninth rotating elements;
   a fourth planetary gear set which has tenth, eleventh, and twelfth rotating elements; and
   six control elements disposed between the rotating elements, and disposed at positions where the rotating elements are selectively connected to a transmission housing,
   wherein the input shaft is continuously connected with the eighth rotating element and simultaneously selectively connected with the fifth rotating element,
   the output shaft is continuously connected with the eleventh rotating element and simultaneously selectively connected with the ninth rotating element,
   the second rotating element is continuously connected with the sixth rotating element,
   the third rotating element is continuously connected to the seventh rotating element and the tenth rotating element,
   the fourth rotating element is continuously connected with the ninth rotating element,
   the first rotating element is selectively connected with the transmission housing, and
   gear shift stages for at least nine forward speeds and at least one reverse speed are implemented by operations of three control elements among the six control elements.

2. The planetary gear train of claim 1, wherein:
   the fifth rotating element is selectively connected with the transmission housing and simultaneously selectively connected with the seventh rotating element, and
   the twelfth rotating element is selectively connected with the transmission housing.

3. The planetary gear train of claim 1, wherein:
   the first, second, and third rotating elements of the first planetary gear set are a sun gear, a planet carrier, and a ring gear, respectively, the fourth, fifth, and sixth rotating elements of the second planetary gear set are a sun gear, a planet carrier, and a ring gear, respectively, the seventh, eighth, and ninth rotating elements of the third planetary gear set are a sun gear, a ring gear, and a planet carrier, respectively, and the tenth, eleventh, and twelfth rotating elements of the fourth planetary gear set are a sun gear, a planet carrier, and a ring gear, respectively.

4. The planetary gear train of claim 1, wherein the six control elements include three brakes, and three clutches.

5. A planetary gear train of an automatic transmission for a vehicle, the planetary gear train comprising:
an input shaft receiving power from an engine;
an output shaft outputting power changed in speed;
a first planetary gear set having first, second, and third rotating elements;
a second planetary gear set having fourth, fifth, and sixth rotating elements;
a third planetary gear set having seventh, eighth, and ninth rotating elements;
a fourth planetary gear set having tenth, eleventh, and twelfth rotating elements;
a first rotating shaft including the first rotating element, and selectively connected to a transmission housing;
a second rotating shaft including the second rotating element and the sixth rotating element;
a third rotating shaft including the third rotating element, the seventh rotating element, and the tenth rotating element;
a fourth rotating shaft including the fourth rotating element, and the ninth rotating element;
a fifth rotating shaft including the fifth rotating element, and selectively connected to the input shaft and the third rotating shaft, or selectively connected with the transmission housing;
a sixth rotating shaft including the ninth rotating element, and directly connected to the input shaft;
a seventh rotating shaft including the eleventh rotating element, and directly connected to the output shaft and simultaneously selectively connected to the fourth rotating shaft;
an eighth rotating shaft including the twelfth rotating element, and selectively connected to the transmission housing; and
six control elements disposed between the rotating elements, and disposed at positions where the rotating elements are selectively connected to the transmission housing.

6. The planetary gear train of claim 5, wherein:
the first planetary gear set is a single pinion planetary gear set in which the first rotating element is a first sun gear, the second rotating element is a first planet carrier, and the third rotating element is a first ring gear,
the second planetary gear set is a single pinion planetary gear set in which the fourth rotating element is a second sun gear, the fifth rotating element is a second planet carrier, and the sixth rotating element is a second ring gear,
the third planetary gear set is a double pinion planetary gear set in which the seventh rotating element is a third sun gear, the eighth rotating element is a third ring gear, and the ninth rotating element is a third planet carrier, and
the fourth planetary gear set is a single pinion planetary gear set in which the tenth rotating element is a fourth sun gear, the eleventh rotating element is a fourth planet carrier, and the twelfth rotating element is a fourth ring gear.

7. The planetary gear train of claim 5, wherein the six control elements include:
a first clutch selectively connecting the fourth rotating shaft and the seventh rotating shaft;
a second clutch selectively connecting the input shaft and the fifth rotating shaft;
a third clutch selectively connecting the third rotating shaft and the fifth rotating shaft;
a first brake selectively connecting the fifth rotating shaft and the transmission housing;
a second brake selectively connecting the first rotating shaft and the transmission housing; and
a third brake selectively connecting the eighth rotating shaft and the transmission housing.

8. The planetary gear train of claim 7, wherein gear shift stages, which are implemented by selectively operating the six control elements, include:
a first forward gear shift stage implemented by simultaneously operating the third clutch and the second and third brakes;
a second forward gear shift stage implemented by simultaneously operating the second and third clutches and the third brake;
a third forward gear shift stage implemented by simultaneously operating the second clutch and the second and third brakes;
a fourth forward gear shift stage implemented by simultaneously operating the first and second clutches and the third brake;
a fifth forward gear shift stage implemented by simultaneously operating the first and second clutches and the second brake;
a sixth forward gear shift stage implemented by simultaneously operating the first, second, and third clutches;
a seventh forward gear shift stage implemented by simultaneously operating the first and third clutches and the second brake;
an eighth forward gear shift stage implemented by simultaneously operating the first and third clutches and the first brake;
a ninth forward gear shift stage implemented by simultaneously operating the first clutch and the first and second brakes; and
a reverse gear shift stage implemented by simultaneously operating the first, second, and third brakes.

9. The planetary gear train of claim 7, wherein gear shift stages, which are implemented by selectively operating the six control elements, include:
a first forward gear shift stage implemented by simultaneously operating the third clutch and the second and third brakes;
a second forward gear shift stage implemented by simultaneously operating the second and third clutches and the third brake;
a third forward gear shift stage implemented by simultaneously operating the second clutch and the second and third brakes;
a fourth forward gear shift stage implemented by simultaneously operating the first clutch and the second and third brakes;
a fifth forward gear shift stage implemented by simultaneously operating the first and second clutches and the second brake;

a sixth forward gear shift stage implemented by simultaneously operating the first, second, and third clutches;
a seventh forward gear shift stage implemented by simultaneously operating the first and third clutches and the second brake;
an eighth forward gear shift stage implemented by simultaneously operating the first and third clutches and the first brake;
a ninth forward gear shift stage implemented by simultaneously operating the first clutch and the first and second brakes; and
a reverse gear shift stage implemented by simultaneously operating the first, second, and third brakes.

10. A planetary gear train of an automatic transmission for a vehicle, the planetary gear train comprising:
an input shaft which receives power from an engine;
an output shaft which outputs power changed in speed;
a first planetary gear set having first, second, and third rotating elements;
a second planetary gear set having fourth, fifth, and sixth rotating elements;
a third planetary gear set having seventh, eighth, and ninth rotating elements;
a fourth planetary gear set having tenth, eleventh, and twelfth rotating elements;
a first rotating shaft including the first rotating element, and selectively connected to a transmission housing;
a second rotating shaft including the second rotating element, and the sixth rotating element;
a third rotating shaft including the third rotating element, the seventh rotating element, and the tenth rotating element;
a fourth rotating shaft including the fourth rotating element, and the ninth rotating element;
a fifth rotating shaft including the fifth rotating element, and selectively connected to the input shaft and the third rotating shaft, or selectively connected with the transmission housing;
a sixth rotating shaft including the eighth rotating element, and directly connected to the input shaft;
a seventh rotating shaft including the eleventh rotating element, and directly connected to the output shaft and simultaneously and selectively connected to the fourth rotating shaft;
an eighth rotating shaft including the twelfth rotating element, and selectively connected to the transmission housing;
a first clutch selectively connecting the fourth rotating shaft and the seventh rotating shaft;
a second clutch selectively connecting the input shaft and the fifth rotating shaft;
a third clutch selectively connecting the third rotating shaft and the fifth rotating shaft;
a first brake selectively connecting the fifth rotating shaft and the transmission housing;
a second brake selectively connecting the first rotating shaft and the transmission housing; and
a third brake selectively connecting the eighth rotating shaft and the transmission housing.

11. The planetary gear train of claim 10, wherein:
the first planetary gear set comprises a single pinion planetary gear set in which the first rotating element is a first sun gear, the second rotating element is a first planet carrier, and the third rotating element is a first ring gear,
the second planetary gear set comprises a single pinion planetary gear set in which the fourth rotating element is a second sun gear, the fifth rotating element is a second planet carrier, and the sixth rotating element is a second ring gear,
the third planetary gear set comprises a double pinion planetary gear set in which the seventh rotating element is a third sun gear, the eighth rotating element is a third ring gear, and the ninth rotating element is a third planet carrier, and
the fourth planetary gear set comprises a single pinion planetary gear set in which the tenth rotating element is a fourth sun gear, the eleventh rotating element is a fourth planet carrier, and the twelfth rotating element is a fourth ring gear.

12. The planetary gear train of claim 10, wherein the six control elements include:
a first clutch selectively connecting the fourth rotating shaft and the seventh rotating shaft;
a second clutch selectively connecting the input shaft and the fifth rotating shaft;
a third clutch selectively connecting the third rotating shaft and the fifth rotating shaft;
a first brake selectively connecting the fifth rotating shaft and the transmission housing;
a second brake selectively connecting the first rotating shaft and the transmission housing; and
a third brake selectively connecting the eighth rotating shaft and the transmission housing.

13. The planetary gear train of claim 12, wherein gear shift stages, which are implemented by selectively operating the six control elements, include:
a first forward gear shift stage implemented by simultaneously operating the third clutch and the second and third brakes;
a second forward gear shift stage implemented by simultaneously operating the second and third clutches and the third brake;
a third forward gear shift stage implemented by simultaneously operating the second clutch and the second and third brakes;
a fourth forward gear shift stage implemented by simultaneously operating the first and second clutches and the third brake;
a fifth forward gear shift stage implemented by simultaneously operating the first and second clutches and the second brake;
a sixth forward gear shift stage implemented by simultaneously operating the first, second, and third clutches;
a seventh forward gear shift stage implemented by simultaneously operating the first and third clutches and the second brake;
an eighth forward gear shift stage implemented by simultaneously operating the first and third clutches and the first brake;
a ninth forward gear shift stage implemented by simultaneously operating the first clutch and the first and second brakes; and
a reverse gear shift stage implemented by simultaneously operating the first, second, and third brakes.

14. The planetary gear train of claim 12, wherein gear shift stages, which are implemented by selectively operating the six control elements, include:
a first forward gear shift stage implemented by simultaneously operating the third clutch and the second and third brakes;
a second forward gear shift stage implemented by simultaneously operating the second and third clutches and the third brake;

a third forward gear shift stage implemented by simultaneously operating the second clutch and the second and third brakes;
a fourth forward gear shift stage implemented by simultaneously operating the first clutch and the second and third brakes;
a fifth forward gear shift stage implemented by simultaneously operating the first and second clutches and the second brake;
a sixth forward gear shift stage implemented by simultaneously operating the first, second, and third clutches;
a seventh forward gear shift stage implemented by simultaneously operating the first and third clutches and the second brake;
an eighth forward gear shift stage implemented by simultaneously operating the first and third clutches and the first brake;
a ninth forward gear shift stage implemented by simultaneously operating the first clutch and the first and second brakes; and
a reverse gear shift stage implemented by simultaneously operating the first, second, and third brakes.

* * * * *